United States Patent [11] 3,624,198

[72] Inventor Howard L. Arbaugh
 Portsmouth, Ohio
[21] Appl. No. 764,941
[22] Filed Oct. 3, 1968
[45] Patented Nov. 30, 1971
[73] Assignee The AR Chem Corporation
 Portsmouth, Ohio

[54] RODENTICIDE BAIT
 2 Claims, No Drawings
[52] U.S. Cl........................................... 424/17,
 424/38, 424/128
[51] Int. Cl....................................... A01n 11/00
[50] Field of Search........................... 424/17, 38,
 128

[56] References Cited
 UNITED STATES PATENTS
3,132,067 5/1964 Rauscher et al............. 424/38
 FOREIGN PATENTS
 750,035 5/1933 France......................... 424/17
1,318,597 1/1963 France......................... 424/128

OTHER REFERENCES
 Chitty, " Control of Rats and Mice," Vol. 1, pp. 100- 101, Oxford at the Clarendo Press, 1954.

Primary Examiner—Albert T. Meyers
Assistant Examiner—Doris J. Funderburk
Attorney—Larson, Taylor and Hinds ABSTRACT: A rodent bait suitable for use on crops comprising a unitary body of intimately mixed particles of metal phosphide such as zinc phosphide, citric acid and a hard wax component. The hard wax component forms a protective coating around the particles of metal phosphide and citric acid. The citric acid has been found to completely decompose the metal phosphide toxicant upon absorption of moisture by the unitary body. Thus, the rodent bait of the invention has the advantage of preventing decomposition of the metal phosphide toxicant until a preset time when it completely decomposes the metal phosphide leaving no toxic residues.

RODENTICIDE BAIT

This invention is directed to a rodenticide bait composition. More particularly, the invention relates to a rodenticide composition of the metallic phosphide type which can be used on food crops.

No rodenticide has ever been approved for use on food crops in view of the obvious toxicity dangers to consumers of food crops treated with the rodenticide. Heretofore, rodenticide compositions which are capable of completely decomposing to leave no toxic residues on the crops, yet stable enough to remain acceptable to the rodents for a sufficient period of time, have been unheard of. For example, metallic phosphides, such as zinc phosphide, have been widely used for rat and mouse bait but they have the drawback of rapidly decomposing when wet or under acid conditions. Although zinc phosphide-cereal baits have been formulated for noncrop use, these baits have not been acceptable for oncrop use since in the absence of moisture the zinc phosphide may be latent in its rate of decomposition and may cause an unacceptable toxicity tolerance in food crops.

In view of the unacceptability of rodenticides for oncrop use, it has been necessary, heretofore, to use some form of bait dispenser or station. Elimination of the need for bait dispensers or stations would represent a significant savings in time and money to those constantly confronted with the problem of rodent control.

It is an object of the invention, therefore, to provide a rodenticide bait composition which prevents the toxicant from decomposing until a predetermined time; yet, when it decomposes, it leaves no toxic residue, a feature which renders the rodenticide bait composition useful on food crops.

Another object of the invention is to provide a rodenticide bait composition which reduces or substantially eliminates a problem that plagues all known rodent baits; that is, the problem of spoilage due to mold, dampness, rancidity and subsequent loss of palatability.

Yet, another object is to prepare a temporarily stabilized rodent bait which is universally acceptable by the rodent even under the most adverse climatic conditions.

A further object is to provide a rodenticide bait which does not require the use of a bait dispenser and which can be dropped by aircraft, thrown or broadcast onto the natural habitat of the rodent. A rodenticide bait which can be dispensed in this manner eliminates costly dispensers and large outlays for manpower for hand-baiting.

These and other objects of the invention are accomplished by a rodenticide bait in the form of a unitary body comprising an intimate mixture of particles of metal phosphide, citric acid particles, and a water-insoluble hard wax component, said wax component being uniformly distributed in said unitary body in the form of a protective coating over said metal phosphide and citric acid particles. It has been surprisingly found that citric acid in the rodenticide bait of the invention acts upon absorption of moisture to completely decompose the metal phosphide on a given schedule. In addition, since many rodents such as the Norway, Roof and Polynesian Rat are attracted to citrus fruits, the citric acid enhances the value of the bait.

The metal phosphides, useful in the present invention, are any of the metal phosphides capable of being decomposed by moisture to phosphine. These phosphides are well known in the pesticide art and include, for instance, the phosphides of alkali metals, alkaline earth metals, aluminum and zinc, nickel, iron and other heavy metals. An especially effective and preferred metal phosphide is zinc phosphide which has been widely used for rat and mouse bait.

The metal phosphides, particularly zinc phosphide, have an odor characteristic of phosphorus which rodents love. It is preferred, however, to include in the bait composition of the invention, in addition to the metal phosphide, rodenticide particles of solid food baits such as are commonly employed in rodenticide compositions. The most popular solid food-type baits are the cereals such as corn, wheat, rye, rice, barley, malt, oat groats, peanut hearts or the like animal proteins, etc., singly or in admixture. Thus, in a preferred embodiment the rodenticide composition of the invention comprises an admixture of the metal phosphide, citric acid, and solid food bait, each in particulate form, coated and impregnated with a hard wax component to form a wax-bound unitary body.

The wax component employed in the bait composition of the invention may be any water-insoluble, relatively hard wax or combination of waxes. Illustrative of suitable waxes are paraffin wax, microcrystalline wax, carnabu wax, beeswax, ceresin wax and the like and mixtures thereof. A particularly preferred wax component comprises paraffin wax with up to about 5 percent by weight of ceresin wax based on the combination of waxes.

Other ingredients commonly added to rodenticide compositions may also be included in the composition of the invention, if desired. These include, for instance, mold inhibitors, flavoring agents and the like.

The concentrations and proportions of wax, metal phosphide and citric acid employed may vary depending upon several factors, for instance, the time desired for decomposition of the metal phosphide, the presence of other ingredients, the particular pest target, etc. In all instances, however, the concentration of citric acid should be sufficient to insure complete decomposition of the zinc phosphide to zinc oxide. Generally, this concentration of citric acid will fall in the range of about 1 to 4 percent by weight based on the metal phosphide which is generally present in an amount of about 1 to 2 percent by weight of the total composition. Ordinarily, it is preferred to employ the metal phosphide and citric acid in substantially equal proportions. The amount of wax component employed should be sufficient to uniformly coat and seal the particles of metal phosphide, citric acid and other components which may be included in the bait composition; the actual amount being primarily dependent upon the desired time for decomposition of the metal phosphide. In general, the amount of the wax component will fall in the range of about 30 to 40 percent by weight of the total composition.

A particularly preferred rodenticide bait composition of the invention comprises, for instance, 1 percent anhydrous-grade citric acid—powdered
1 percent zinc phosphide
35 percent microfined paraffin wax—U.S. P.-grade,
the balance being food bait particles such as cereals plus stabilized animal proteins.

The rodenticide bait of the invention may be prepared, for instance, by intimately mixing particles of metal phosphide, preferably in powder form, citric acid particles and other ingredients such as solid food bait in particulate form with the wax component in molten form. The resulting mixture may be formed into a shaped article by molding, pelleting, tabletting, etc.

In a preferred method, particles of the metal phosphide together with particles of solid bait and the wax component are first intimately mixed at a temperature in excess of the melting point of the wax component. The citric acid is then added and the mixing continued at the elevated temperature, after which the mixture is extruded and molded into wax-bound and impregnated slugs. This method insures complete binding of all the ingredients into a slug with each particle coated and impregnated with the wax component.

The following example is included to further illustrate the present invention. In the example, the percentages are based on the total weight of the composition.

EXAMPLE

To a mixer equipped with heating means is charged cereal grains, stabilized protein particles and 1 percent technical-grade zinc phosphide. After these components are thoroughly mixed, 35 percent pure microfined table-grade paraffin wax and 2 percent microfined ceresin wax are added and the temperature of the mixture is brought to 180° F. with continuous stirring. 1 percent anhydrous-grade citric acid is then added and after thorough mixing, the entire mixture is extruded under a pressure of 25,000 p.s.i. through a two-well shoulder design die having an orifice diameter of three-fourths inch, heated to a temperature of 165° F. The initial well of the die opens into a second well and is of larger diameter than the second well. The second well, in turn, opens into a ¾-inch die channel and is of larger diameter than the channel. The total distance between the entrance to the first well of the die to the orifice is approximately 4 inches. The extrudate is thereby compressed inward and downward in two steps to form a very compact extrudate. The compact extrudate is cut into 1½-inch length to provide a wax-bound and impregnated rodenticide bait slug, three-fourths inch in diameter and 1 ½ inches in length.

It is claimed:

1. A melt extruded slug for rodent control comprising an intimate mixture of about 1 to 2 percent by weight zinc phosphide particles, about 1 to 2 percent by weight citric acid particles, about 30 to 40 percent by weight of a wax component selected from the group consisting of paraffin wax and a mixture of paraffin wax and up to about 5 percent by weight of ceresin wax, with the remainder being particles of food bait, said wax being uniformly distributed in said slug and coating each of said zinc phosphide, citric acid and food bait particles.

2. A melt extruded slug according to claim 1 comprising about 1 percent by weight zinc phosphide particles, about 35 percent by weight paraffin wax, about 2 percent by weight ceresin wax and about 1 percent by weight citric acid particles.

* * * * *